Nov. 16, 1954  W. E. SWIFT ET AL  2,694,315
PNEUMATIC CONTROL DEVICE
Filed July 7, 1949  2 Sheets-Sheet 1
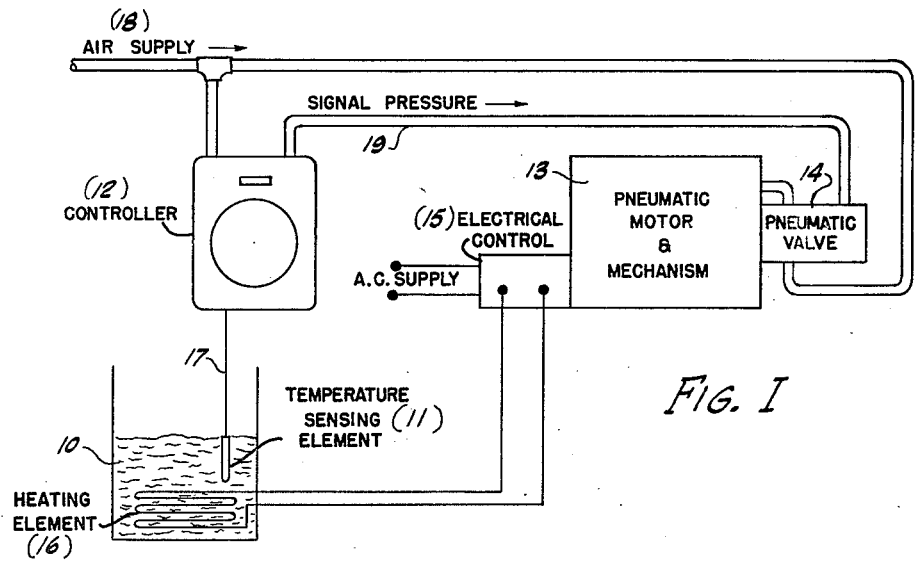
Fig. I
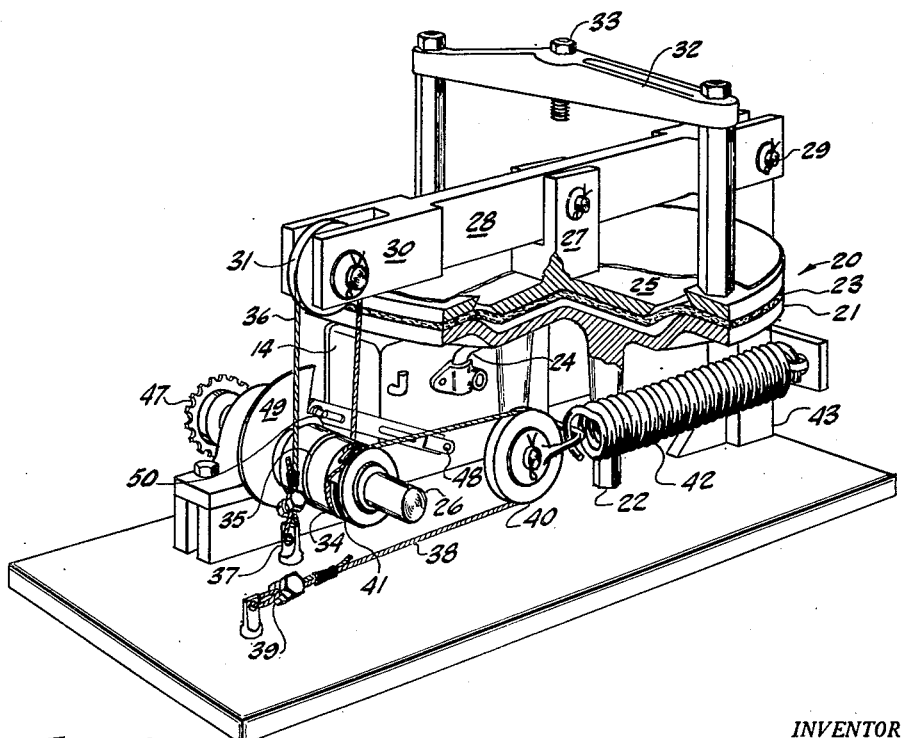
Fig. II
INVENTOR.
W. EVERETT SWIFT
RICHARD F. FARDY
BY
Curtis, Morris & Safford Nov. 16, 1954  W. E. SWIFT ET AL  2,694,315
PNEUMATIC CONTROL DEVICE
Filed July 7, 1949  2 Sheets-Sheet 2
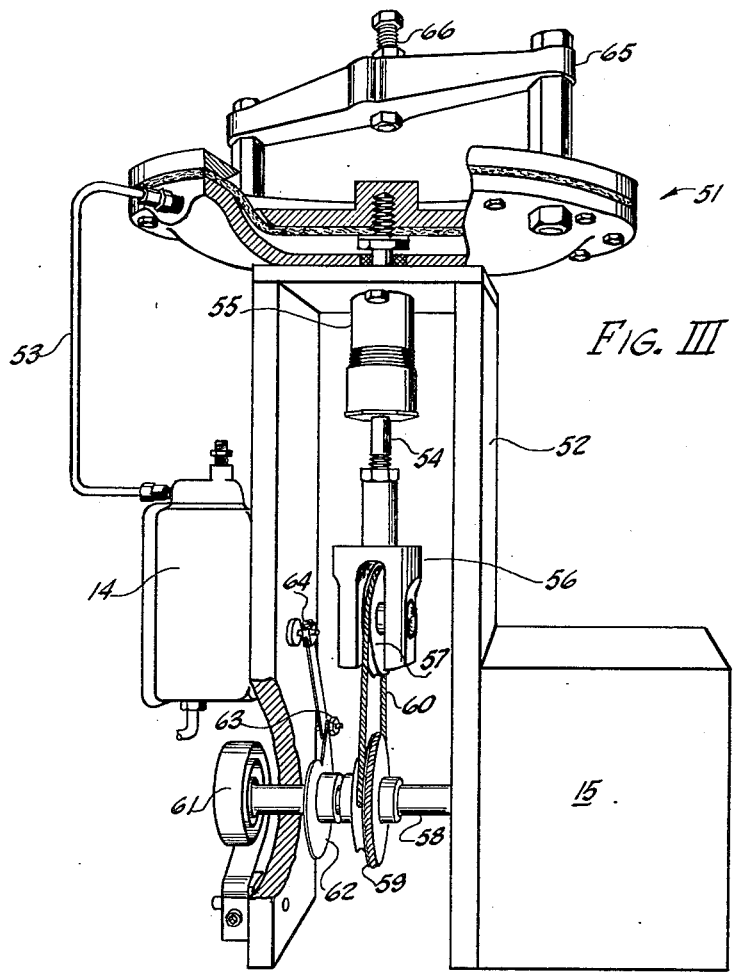
FIG. III
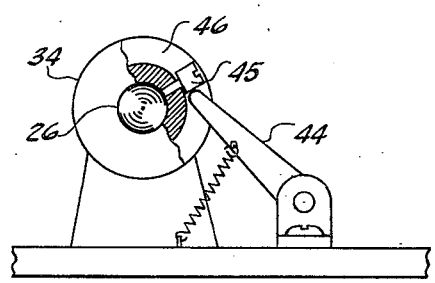
FIG. IV
INVENTOR.
W. EVERETT SWIFT
RICHARD F. FARDY
BY
Curtis, Morris & Safford United States Patent Office 2,694,315
Patented Nov. 16, 1954

2,694,315

PNEUMATIC CONTROL DEVICE

W. Everett Swift, Sharon, and Richard F. Fardy, Foxboro, Mass., assignors to Foxboro Company, Foxboro, Mass., a corporation of Massachusetts Application July 7, 1949, Serial No. 103,451

3 Claims. (Cl. 74—95)

This invention relates to industrial process control apparatus and has particular reference to devices utilizing a diaphragm type pneumatic motor to operate a control unit.

It is an object of this invention to provide a new and improved connection construction between such a pneumatic motor and control unit.

It is a further object of this invention to multiply and translate the motion of a pneumatic motor diaphragm into rotary motion for a control unit.

Another object is to provide means for controlling such a pneumatic motor so that, for a given actuating signal to the motor, an exact, related position is achieved in the control unit, through the rotary motion.

Another object is to provide means for operating such a pneumatic motor so that the rotary motion is in definite controlled relation with the motion of the diaphragm, for example, linear, logarithmic, or by the square.

There have been structures in the past in which rotary control motion has been produced from the movement of the diaphragm of a pneumatic motor, for example, a shaft movable on its axis by the movement of a diaphragm has been employed to pivot a sector gear which in turn operated to turn a pinion on its axis to provide the desired rotary motion. Such structures have been found to be expensive and lacking in adaptability. Friction in gearing, possible lost motion, and the expense and bulk involved in getting sufficient multiplication of motion to provide a substantial rotary motion are factors of disadvantage in relation to such structure. Other possible structures involve the use of a piston operating a rack and pinion, or worm gear arrangement to translate straight line to rotary motion, but such pistons have a tendency to stick and jump and so these would not be suitable structures even if the disadvantages of gearing arrangements were overcome. The structures contemplated by this invention are readily adaptable to a variety of needs, and are comparatively inexpensive. Considerable multiplication is possible with small bulk and inexpensive construction, and the motion is smooth, with no frictional or lost motion difficulties.

In the drawings:

Figure I is a schematic illustration of the relation of an embodiment of this invention to a heating process control arrangement;

Figure II is a perspective view of an embodiment of this invention in which a combination of lever and pulley arrangement is used;

Figure III is a perspective view of an embodiment of this invention in which a differential pulley arrangement is used; and Figure IV is an illustration of a safety stop.

Referring to Figure I as an illustration of one of the many processes in which an embodiment of this invention may be used, a body of liquid 10 is controlled to a desired temperature by means of the arrangement of apparatus as shown, comprising a temperature sensing element 11, an automatic controller 12, a unit 13 which is a structure such as is shown in Figure II or Figure III with a pneumatic valve unit 14 on the input side and a rotary operated control unit 15 on the output side, and a heating element 16.

The temperature sensing element 11 may be in the form of a vapor pressure thermometer with a pressure connection 17 to the controller 12. This controller may be of the type shown in the pending application of Hoel L. Bowditch, Serial #692,102, filed August 21, 1946, for a Controller. The purpose of the controller 12 is to maintain a desired temperature in the liquid body 10. The controller 12 is powered from an air supply 18, and the output, as at 19, of the controller is a pneumatic signal resulting from and in definite relation to a temperature change in the liquid 10 as sensed by the thermometer 11.

The pneumatic output signal from the controller 12 is applied to the pneumatic valve unit 14, the purpose of which is to make certain that the position of the motor and mechanism 13 and the control 15 is exactly what it should be for the particular signal that is applied to the valve unit 14. A considerable force is first applied, and this is cut down as the exact position is approached. This eliminates inaccuracies due to friction, lag, or overshoot and makes it possible to provide specific and accurate relations between the adjusted positions of the electrical control 15 and the pneumatic signals applied to the valve unit 14. These are the relations previously mentioned herein, with examples being linear, logarithmic or by the square relations.

The pneumatic valve unit 14 is also powered from the air supply 18 and is of the type shown in the patent issued to Lyman Cook, No. 2,240,244, April 29, 1941, for a Control Mechanism. The pneumatic signal from the controller 12 operates a flapper nozzle arrangement in this valve unit as a valve control.

The adjustment of the electrical control 15 is mechanical and rotary and represents the output of the motor unit 13. In this manner electrical resistance may be so changed that the heating element 16 is made to respond to temperature variations in the liquid body 10 as sensed by the thermometer 11. The structure and operation of units suitable to be used in the place shown for the unit 13, pneumatic motor and mechanism, will be described hereafter in connection with Figures II and III of the drawings.

It is particularly pointed out that the process and apparatus arrangement as shown in Figure I is merely illustrative. Many other processes and apparatus arrangements as well as variations in the details of the unit 13 may readily come within the scope of this invention as expressed in this specification and the claims, taken in the light of the accompanying drawings.

The structure of either Figure II or Figure III may be used as the unit 13 of Figure I. The purpose of these structures is to change pneumatic pressure into mechanical motion, and in particular into rotary mechanical motion having a definite relation to the pneumatic pressure, so that any of various controls which may be operated from a rotary mechanical motion, may be operated from a pneumatic signal. In this manner, for example, if the rotary motion is used to operate a rheostat, variations in a pneumatic signal are translated into changes in electrical resistance values.

In the structure of Figure II there is a common type of pneumatic motor 20 with a rigid dished base plate 21 solidly supported by uprights 22, a flexible diaphragm 23 overlying the dished formation and peripherally secured to the base plate to form a closed chamber which expands and contracts as pneumatic pressure medium is forced thereinto or allowed to escape therefrom. Such pressure medium enters and leaves the chamber through an opening in the base plate 21 and a conduit 24 which connects the diaphragm chamber with the pneumatic valve unit 14. A rigid plate 25 is mounted for movement with the diaphragm 23 and is rested on the diaphragm and the base plate 21, and the plate 25 is connected, through a mechanical arrangement, to a rotary drive shaft 26. The motion of the diaphragm 23 is, accordingly, transmitted to the shaft 26 and the essentially straight line motion imparted to the rigid plate 25 by the diaphragm 23 is translated into rotary motion in the shaft 26.

This mechanical connection arrangement in this instance begins with an upright 27 secured to the rigid plate 25, and a lever 28 overlying the motor and mounted at one of its ends on a fixed fulcrum pivot 29 at one side of the pneumatic motor, the lever being pivoted on the upright 27. The lever 28 terminates at its other end in a clevis 30 in which a free running pulley 31 is mounted on an axis at right angles to the diaphragm motion. Thus, movement of the diaphragm causes the pulley 31 to be bodily moved up or down as pneumatic power medium is respectively, applied to or withdrawn from the diaphragm chamber. A limit on the upward movement of the diaphragm is provided in the form of a bridge 32 over the body of the pneumatic motor, and an adjustable screw 33 is mounted on the bridge over the upright 27 for limiting contact therewith or with the lever 28 as the diaphragm chamber is expanded.

The rotary shaft 26 is mounted with its axis also at right angles to the diaphragm motion and has a cylinder drum 34 fixed thereon with peripheral grooves 35 for receiving and winding a flexible cable 36 thereon. The rotary shaft 26 and the lever 28 are connected by the flexible cable, it having one end fixed with respect to the mechanism as at 37, and extending therefrom up and over the lever pulley 31, then down and around the drum 34, in the grooves 35, and terminating in a connection to the drum.

With this arrangement, bodily movement of the lever pulley 31 rotates the shaft 26 with the motion multiplied by means of the pulley and cable arrangement. A movement of the diaphragm 23 is, therefore multiplied not only through the lever 28 but also through the pulley and cable connection to the rotary shaft 26, since movement of the diaphragm upwards unwinds the cable from the drum to an additional length twice the distance the pulley is moved away from the rotary shaft and the shaft is rotated counterclockwise.

A spring bias is applied to the rotary shaft, urging it in a clockwise direction to wind the cable on the drum as the diaphragm is moved downward. This bias arrangement includes a flexible cable 38 with one end fixed with respect to the mechanism, as at 39, and which extends therefrom around a bodily movable pulley 40 and back to the drum 34 about which it extends in grooves 41, and to which it is secured. A helical spring 42 extends between the pulley 40 and a fixed upright 43 so as to constantly urge the pulley 40 away from the rotary shaft 26. A sufficient force is applied in this manner to reverse the rotation of the shaft 26 as the pressure in the diaphragm is reduced, against frictional and torque forces in the device itself and in the control unit 15 (Figure I) which is operated by the device. With the cable 38 so mounted as to multiply the bodily movement of the pulley, the spring 42 needs to operate only through a comparatively short distance and the force applied by the spring is accordingly more uniform. The spring 42 is loaded on assembly by securing one end of the cable 38 to the drum 34 and winding the cable thereon by using the drum and shaft 26 as a windlass until a substantial bias is applied to the shaft 26 at the zero point of the motor 20, that is, when the minimum pressure is applied to the diaphragm. Thus the spring 42 is always acting under a considerable load. For example, if the spring is capable of handling 300 pounds, the minimum load could be set as above, at 150 pounds. Also, a safety stop is shown in Figure IV. A pawl 44 is fixed so as to engage an insert 45 in a groove 46 in the drum 34 at the set limit of the return motion of the shaft 26. In the event of breakage or disconnection of the cable 36, much damage could result if, without this stop, the full force of spring 42 were suddenly applied to the shaft 26. This safety stop may be applied to either the structure of Figure II or that of Figure III. All that is necessary is to provide a stop pin in a groove in or around the shaft 26 or 58, and to mount the pawl 44 on the framework of the device for cooperation with the groove and stop, as shown in Figure IV.

In this particular structure, Figure II, a sprocket 47 is mounted on one end of the rotary shaft 26 and the control unit 15 of Figure I may be operated from this sprocket through a chain drive or from any suitable gear in place of the sprocket in a direct contact gearing arrangement. Further multiplication of movement may thus be obtained from either of these arrangements if desired. References herein to exact positions of the rotary shaft are intended to mean also, exact positions or adjustments of the control unit 15.

The pneumatic valve unit 14, as previously referred to in Figure I, is mounted adjacent the pneumatic motor 20 and the output therefrom is applied to the diaphragm chamber through the conduit 24. It will be seen by reference to the Patent No. 2,240,244 previously cited herein that the incoming signal from the controller 12 varies a flapper-nozzle arrangement in the pneumatic valve unit 14. This variation causes a change in the pneumatic pressure in the diaphragm chamber with consequent rotation of the rotary shaft 26. In order to achieve a balance in the flapper-nozzle arrangement of the valve unit 14, a cam 49 is mounted on the rotary shaft 26 with a follower 50 riding thereon. The cam 49 is shaped so that rotation of the shaft 26 lifts or lowers the follower 50, so as to turn it about its pivotal mounting 48 in the unit 14. This action affects the arrangement of the flapper-nozzle unit to counteract the change therein resulting from the pneumatic signal from the controller. Accordingly, a balance will not be achieved in the valve unit 14 until the shaft 26 has been rotated to exactly the position intended as representative for the particular signal which was received by the valve unit. Friction in the mechanism or other losses or inaccuracies, are compensated for since the valve unit keeps applying power until the shaft 26 rotates to a position which is related as planned, to the pneumatic signal as applied to the valve unit. The cam 49 may be cut to any desired shape so that whatever relation is desired between the pneumatic signals and the rotary position of the shaft 26 may be achieved.

An alternate structure is shown in Figure III, with a pneumatic motor 51 mounted on uprights 52. Pneumatic power is applied to the motor from the valve unit 14 through the conduit 53, and as the pressure is applied to the motor, a shaft 54 is raised through a stuffing box 55. The shaft 54 has a clevis 56 on the lower end thereof with a free running pulley 57 mounted therein.

The rotary shaft 58 of this structure is mounted in the uprights 52 with its axis at right angles to the motor diaphragm movement. A differential pulley 59 is mounted on the shaft 58 and fixed thereto, with a flexible cable 60 having one end fixed to the smaller of the two pulleys and wound thereabout, the cable then extending up and over the free pulley 57, then down and about the larger of the two pulleys to terminate in a connection to that pulley. As the diaphragm in the motor 51 is forced upwardly, the pulley 57 is moved bodily upward away from the rotary shaft 58. Because of the difference in leverage between the two pulleys of the differential pulley and because the small and large pulleys are joined as one pulley unit, the upward movement of the free pulley 57 unwinds the cable from the larger of the two pulleys and winds it on the smaller thus rotating the rotary shaft 58. This provides a multiplication of the movement of the motor diaphragm as well as a translation from straight line to rotary motion.

A bias is applied to the rotary shaft in the form of a flat spiral spring 61, which tends to rotate the shaft 58 in the opposite direction to that produced when the free pulley 57 is raised. The housing 15 represents a rotary motion operable control unit which is operated by the rotation of the shaft 58. A cam 62 is mounted on the rotary shaft for movement therewith, and a follower 63 rides on the cam 62 and is pivoted at 64 in the pneumatic valve unit 14. The multiplication factor between the straight line and rotary motion may be varied by changing the differential pulley for one with a different diametric relation between the small and large pulleys, and the relation between the pneumatic signal and the rotary motion of the shaft 58 may be varied by changing the cam 62 for one of different configuration. The pneumatic valve unit 14 operates in the same manner as it does in connection with the structure of Figure II and as illustrated in Figure I. Also a bridge 65 is provided over the motor 51, with an adjustable screw 66 mounted therein for limiting the movement of the movable portion of the motor 51.

From the foregoing it will be seen that this invention provides a new and improved means for translating and multiplying pneumatic signals into rotary motion with exact relative positional relations.

We claim:

1. In an industrial process control unit, apparatus for translating essentially straight line movement into rotary movement, comprising, in combination, a member mounted for essentially straight line movement in response to a variable condition change, a pulley support connected to said member for movement therewith, a pulley rotatably mounted on said support, a rotary control shaft, with said pulley and said support movable together toward and away from said shaft in accordance with said straight line movement of said member, and a flexible cable over said pulley and about said shaft for positively rotating said shaft in response to said movement of said pulley away from said shaft, said cable having both ends in anchoring arrangements in opposition to said movement of said pulley away from said shaft, with one of said arrangements providing less of said opposition than is provided by the other, and said one of said arrangements comprising one of said cable ends anchored to said rotary shaft, whereby rotation of said shaft must accompany said movement of said pulley away from said shaft.

2. In an industrial process control unit, apparatus for translating essentially straight line movement into rotary movement, comprising, in combination, a pneumatic motor having therein a pneumatic pressure responsive diaphragm and a member associated with said diaphragm for essentially straight line movement in response to movement of said diaphragm, a pulley lever mounted on said member for movement therewith, a pulley rotatably mounted on said lever, a rotary control shaft, with said pulley movable toward and away from said shaft in accordance with said straight line movement of said member, means applied to said shaft as a bias for rotation of said shaft in one direction, and a flexible cable over said pulley and about said shaft for positively rotating said shaft against said bias in response to said movement of said pulley away from said shaft, said cable having one end anchored to said rotary shaft and its other end anchored to a fixed member, whereby rotation of said shaft must accompany said movement of said pulley away from said shaft.

3. In an industrial process control unit, apparatus for translating essentially straight line movement into rotary movement, comprising, in combination, a pneumatic motor having therein a pneumatic pressure responsive diaphragm and a member associated with said diaphragm for essentially straight line movement in response to movement of said diaphragm, a pulley support connected to said member for movement therewith, a pulley rotatably mounted on said support, a rotary control shaft, with said pulley and said support movable together toward and away from said shaft in accordance with said straight line movement of said member, a differential pulley fixed on said shaft, means applied to said shaft as a bias for rotation of said shaft in one direction, and a flexible cable for positively rotating said shaft against said bias in response to said movement of said pulley away from said shaft, said cable being wound about one diameter of said differential pulley, over said support pulley, and about another diameter of said differential pulley, and said cable having both ends effectively anchored to said shaft, whereby rotation of said shaft must accompany said movement of said pulley away from said shaft.

References Cited in the file of this patent

UNITED STATES PATENTS

| Number | Name | Date |
|---|---|---|
| 193,027 | Otis | July 10, 1877 |
| 434,839 | Schmitt | Aug. 19, 1890 |
| 545,980 | Reynolds | Sept. 10, 1895 |
| 1,961,343 | Donaldson | June 5, 1934 |
| 2,027,275 | Foster | Jan. 7, 1936 |
| 2,053,797 | King | Sept. 8, 1936 |
| 2,240,244 | Cook | Apr. 29, 1941 |
| 2,245,562 | Becker | June 17, 1941 |

FOREIGN PATENTS

| Number | Country | Date |
|---|---|---|
| 244,968 | Italy | Apr. 13, 1926 |